INDUCTION IMAGE FORMATION

Filed April 2, 1962

INVENTOR.
FREDERICK A. SCHWERTZ
BY
Stanley Z. Cole
ATTORNEY

United States Patent Office 3,254,998

Patented June 7, 1966

3,254,998

INDUCTION IMAGE FORMATION

Frederick A. Schwertz, Pittsford, N.Y., assignor to Xerox Corporation, Rochester, N.Y., a corporation of New York Filed Apr. 2, 1962, Ser. No. 184,326
8 Claims. (Cl. 96—1)

Figure 1:
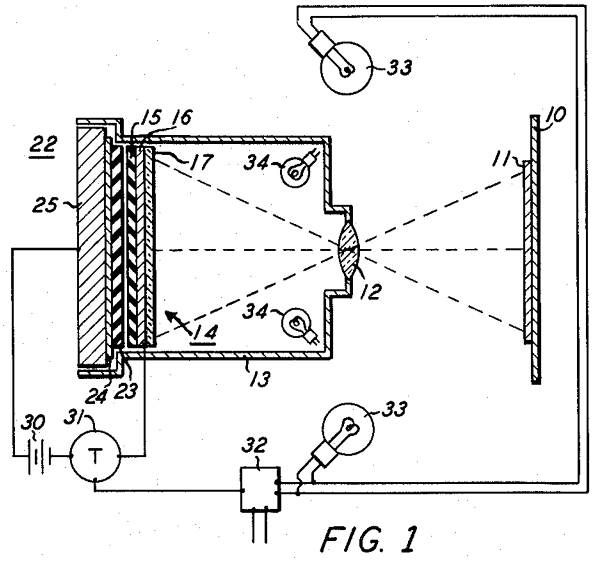

This invention relates to xerography and in particular to improved method and apparatus for charge deposition.

In the process of xerography, for example, as first disclosed in Carlson patent 2,297,691, issued October 6, 1942, a zerographic plate comprising a layer of photoconductive insulating material on a conductive backing is given a uniform electric charge over its surface and is then exposed to the subject matter to be reproduced, usually by conventional projection techniques. This exposure discharges the plate areas in accordance with the radiation intensity that reaches them, and thereby creates an electrostatic latent image on or in the photoconductive layer. The latent image thus formed may thereafter be utilized, as for example, by being developed with an electroscopic powder which may be affixed to the xerographic plate, or optionally transferred to a secondary support surface on which it is affixed, or the latent image may be utilized without development as though sensing or for transfer to other surfaces by techniques known in the art.

Various means of charge deposition are known in the art of xerography including corona charging and a form of induction charging as disclosed, for example, in the above-cited Carlson patent for depositing charge onto a xerographic plate. After depositing a charge uniformly onto a xerographic plate, it is usual to discharge the plate selectively on exposure to radiation of predetermined intensity as to form an electrostatic latent image.

Recently there has been discovered a novel method of depositing electrostatic charge onto insulating surfaces by principles of induction wherein the chargeable member comprises an insulating layer of current insulating rectifying material that preferentially conducts one polarity of charge carrier and like a diode, conducts in one direction only. This prior method first charges or alternatively charges and exposes a xerographic plate conventionally, which charge is then employed to correspondingly charge the insulating rectifying layer.

In the art of xerography, most plate members when charged respond to radiation in a manner such that each unit of radiation energy, such as a photon, exposed to the plate surface produces less than one charge carrier to dissipate the charge. There are also known plate members which result in multiplication effects. These effects are attributed to solid state qualities that cause a multiplication of charge carriers so that the plate exhibits increased speed sensitivity when exposed to the same unit of radiation energy. This then results in an equivalent charge dissipation of the plate on exposure to a lower intensity of radiation as compared to conventional plates, or contra, effects more rapid dissipation on exposure at the same level of radiation intensity. These multiplying plates, however, although exhibiting greater sensitivity than conventional plates, are also characterized by high or rapid dark decay properties. That is, these multiplying plates are unable to retain an applied charge in the absence of radiation, such that images of charge formed during exposure decay too rapidly to be developed.

Now in accordance with the instant invention, there is provided novel improved method and apparatus for inducing charge into insulating rectifying layers. By means of the invention, electrostatic latent images are induced onto the insulating rectifying layer simultaneous with a radiation exposure of an original copy thus according more efficient, expeditious image formation than known by the prior art. In addition by employing multiplying plate structures as an inducing member, the invention accords increased speed sensitivity in the inducing of electrostatic latent images onto an insulating rectifying layer. The image thus induced may thereafter be utilized in any of the conventional forms of xerography.

Accordingly, the instant invention has for an objective the formation of electrostatic latent images on insulating rectifying layers simultaneous with an exposure of area of a photo-responsive member adjacent and across said layer. In accordance with this objective, images formed employing high speed multiplying xerographic plates are induced into an adjacent insulating rectifying layer and there preserved for further processing.

It is a further object of the invention to provide improved method and apparatus for induction formation of image patterns on insulating rectifying layers.

It is a further object of the invention to provide improved novel method and apparatus for induction formation of image patterns on insulating rectifying layers during exposure.

It is a further object of the invention to form induced charge patterns on insulating rectifying layers from patterns of activating radiation having a lower radiation intensity than was required for image formation by method and apparatus known heretofore.

It is still a further object of the invention to device novel apparatus and method to induce charges on insulatinp rectifying layers in predetermined pattern configuration formed substantially simultaneously with exposure of a high speed xerographic plate.

Figure 2:
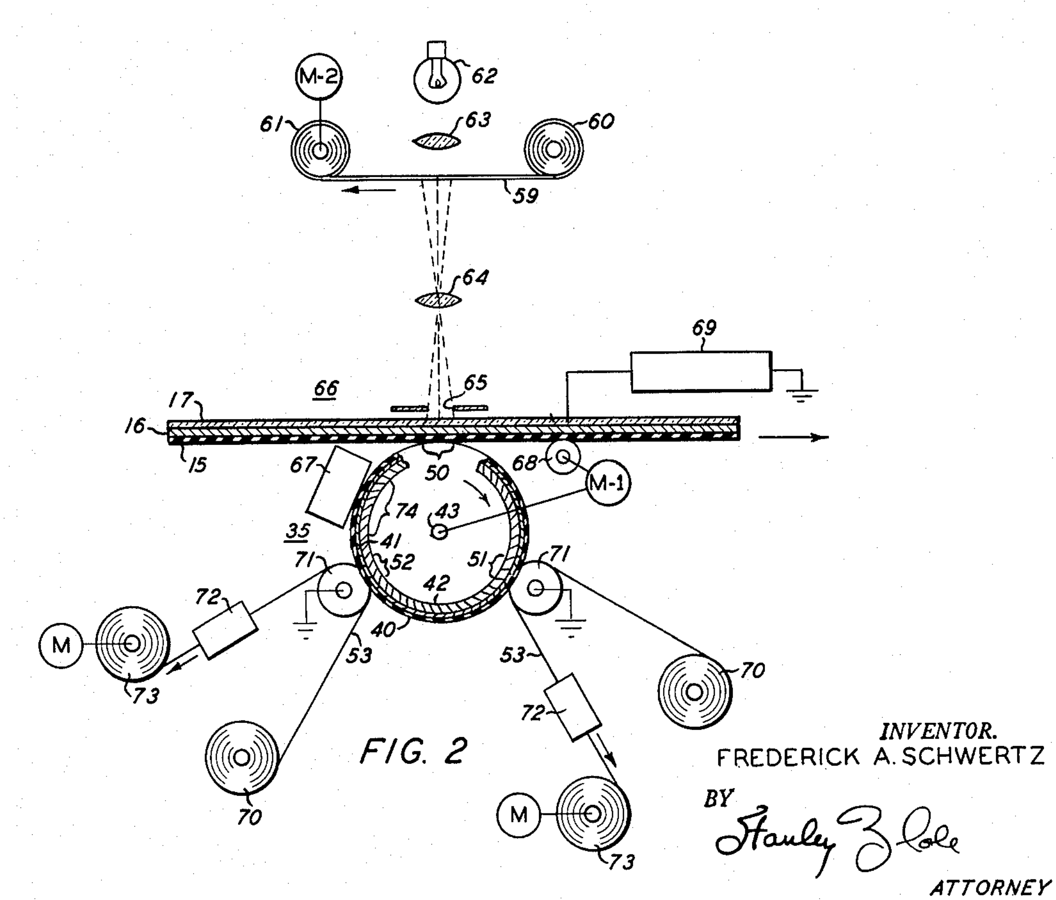

Embodiments of the invention are illustrated in the following drawings in which:

FIG. 1 is a sectional view of an embodiment of apparatus in accordance with the invention; and, FIG. 2 is a sectional view of an embodiment of a continuous automatic apparatus in accordance with the invention.

Referring to FIG. 1, there is illustrated apparatus including support means 10 to support original copy 11 to be reproduced. Copy 11 is exposed through a conventional objective lens 12 supported in a suitable light-tight housing 13 enclosing the radiation and light sensitive members utilized for image formation. Supported in the focal plane of the lens is a photoconductive member, generally designated 14, that may comprise, for example, a xerographic plate having a photoconductive layer 15 of vitreous selenium overlying a conductive member which in this embodiment is transparent and may comprise a transparent coating 16 such as tin oxide on an insulating glass transparent base 17.

The induced image is to be formed on an insulating rectifying plate, designated 22, that may, for example, comprise a vitreous selenium layer 23 supported on an interfacial layer 24 such as copper oxide, in turn overlying a conductive backing member 25.

A potential from a source 30 is applied across the sandwich as shown for a predetermined programmed period controlled by a suitable timing device 31 to form an induced electrostatic latent image on the surface of layer 23. On energizing of the timer, there is applied a potential between the conductive layers while simultaneously, through relay 32, lamps 33 are energized from a 110 volt source to illuminate the pattern of copy 11. As the copy pattern is illuminated, the light image of the copy renders layer 15 selectively conductive in pattern configuration corresponding to the light areas of the copy to form an electrostatic latent image on the interface surface of layer 15. The pattern thus formed at the interface is effective to induce on the surface of layer 23, an opposite polarity charge in position in adjacent areas across the areas of charge on surface 15 and conforming also to the configuration of the pattern of copy 11. After separating the plate 22 from plate 14, the electrostatic latent image induced on the surface of layer 23 can be utilized for development, as in the process of xerography, can be used to subsequently induce image patterns onto secondary insulating rectifying layers to be described, or can be used for such other utilization purposes known to those in the art. Thus, following the application of a selective field pattern of an original image, there is induced a charge pattern on the insulating rectifying layer conforming in configuration to the pattern of copy 11.

The image formed on layer 15 will remain on its surface for a period depending on the decay rate property of the photoconductor used. If layer 15 has a low decay rate, the image can be reused for subsequent induction charging without the necessity of re-exposing under an applied field. On the other hand, even with a low decay rate characteristic, if it is not desired to reuse this image, it can be erased by a uniform illumination of light from lamps 34 under control of a suitable On-Off switch.

Reference is not had to FIG. 2 in which is illustrated an embodiment of an automatic apparatus employing the instant invention. An insulating rectifying layer in the form of a cylindrical drum, generally designated 35, in accordance with the invention may comprise, for example, a vitreous selenium layer 40 overlying a copper oxide interlayer 41 on a conductive aluminum base 42 and which drum is mounted for rotation about a shaft 43 that is driven continuously by a motor M–1. Drum 35 is driven in the direction indicated by the arrow and moves first through an image forming station 50, to be described, and next to image induction stations 51 and 52 whereat the induced image formed at station 50 is utilized for forming secondary induction images on plate members 53 having an insulating rectifying layer of opposite polarity characteristics to that of drum 35 as will be understood.

Original copy that is to be reproduced may, for example, be contained on a continuous microfilm web 59 although any conventional copy source and projection technique known in the art of xerography or photography can be employed in the alternative. The film web is continuously advanced by means of a motor M–2 from a supply reel 60 to a takeup reel 61 inbetween which it passes an illumination source comprising, for example, a lamp 62 and a condenser lens 63. The image pattern is optically projected by an objective lens 64 which may, if desired, have a focal length adapted to effect projection at a desired magnification ratio. The light image is projected downward in this embodiment through a projection slit 65 onto an advancing photoconductive member 66, that may be constructed similarly as member 14 of FIG. 1, and is continuously energized from a power source 69. Drum 35 moves at a synchronous rate with the rate of the projected image and member 66 is driven through a suitable gear-wheel 68 from motor M–1 at a linear rate identical with the peripheral rate of drum 35. For illustrative purposes, member 66 is shown of finite length which will necessitate its being returned to a leftmost starting position between exposures out of physical contact with drum 35 if the latter continues to rotate. Alternatively, member 66 can be constructed of flexible material or connected rigid segments and made endless for continuous recycling. In the latter instance there will be required an image erasure means, such as a source of illumination (not shown) to eliminate unwanted patterns remaining on surface 15 after utilized for induction, and means to offset the endless member after image formation around the projection path as to avoid interfering with the image being projected.

Operation of the unit can be continuous with drum 35 being constantly recycled after erasure by an erase unit 67 at an erase station 74. Alternatively, the exposure mechanism, plate power supply, and erasure mechanism may be placed in inoperative condition and the apparatus run as a copy duplicator. That is, following movement of drum 35 past the image forming station 50, there exists on the drum surface an induced image pattern of charge. This pattern is advanced to induction image stations 51 and 52 whereat a web member 53 having an insulating rectifying layer is supplied from a supply spool 70 and moves around a roller 71 which, as illustrated in this embodiment, is maintained at ground potential.

Speed of movement of members 53 is synchronized with the speed of rotation of drum 35 and as the drum surface contacts the surface of web 53, charge patterns previously induced on the drum surface cause re-induction onto the surface of plate members 53. The insulating rectifying layer of web 53 may in this embodiment comprise a layer of zinc oxide in an insulating binder overlying a conductive backing such as foil or paper in a conductive condition or the like. With a positive charge pattern on the surface of drum 35, negative charge patterns conforming in configuration to the image pattern projected will be formed on the surface of members 53 at the charge induction stations 51 and 52.

Following image induction at stations 51 and 52, members 53 are advanced out of contact with the surface of drum 35 and are advanced through processing stations 72. At the process stations, the charge patterns on the surface of 53 may be developed and fused to form duplicate hard copy or may be otherwise utilized as, for example, through scanning or the like to create electrical signals for utilization as for display on cathode-ray tubes or the like. Following passage through the process stations, members 53 are advanced onto takeup spools 73. As is well known in the art, these webs may be cut into appropriate lengths and stacked rather than fed to take-up spools as shown.

Alhough two charge induction stations are shown, it should be realized that in the concept of the instant invention the image on drum 35 is in no way affected while the charge is induced into an adjacent member such as web 53. Accordingly, any number of stations may be positioned around the charge inducing member, which in this instance is drum 35, to induce charge into adjacent members substantially any number of times. After passing the induction stations, drum 35 is advanced through an erase station 74 whereas the insulating rectifying layer, which is also photoconductive, may be illuminated with light to erase the charge pattern from its surface and thus prepare the drum for recycling.

In each of the described embodiments, it has been considered that the insulating rectifying material is chosen on exposure to generate a range of charge carries sufficient to operate as described. Where the circumstances require, the range may be enhanced by applying selective levels of heat or radiation as by employing a transparent substrate 25 through which light can be applied in conjunction with the exposure step. Thus it was found that when using a 1½ mil zinc oxide plate formed of a zinc oxide photoconductor in a silicone binder on an aluminum substrate, spaced opposite a NESA (tin oxide) backed vitreous selenium plate on a transparent glass substrate, a satisfactory image was induced on the zinc oxide surface. The air gap between the two surfaces was believed to be less than about five microns in thickness and as uniform as possible. The image was formed of a photographic negative placed on the glass substrate of the selenium and rear illumination from a high intensity light source of about 4500 angstroms effectively placed a shadow image on the selenium surface. Simultaneously, a potential on the order of approximately 600 volts was connected to the substrates with the negative pole being connected to the aluminum substrate and the positive pole connected to the NESA. The voltage was applied for a period of approximately 30 seconds after which the two electrodes were shorted out and the plates separated. After separation, a negative voltage of greater than 200 volts was found to have been induced onto the zinc oxide surface. This charge, which constituted a latent electrostatic pattern of the negative image, was developed by well-known techniques of xerography and resulted in a sharp, dense image as is commonly associated with a large negative charge. An opposite positive charge was formed on the selenium surface.

Briefly as understood, there are basically two forms of insulating rectifying materials, those which are preferentially conductive with a majority of charge carriers for positive charge carriers (holes), are termed *"p"* type, and those conductive for negative charge carriers (electrons) are termed *"n"* type. Some materials may respond in varying degrees to either form of charge carrier but being substantially insulators as all insulating rectifying layers contain virtually no intrinsic charge carriers but rather possesses only those charge carriers injected therein from an external source or generated therein by the activity of activating radiation. The zinc oxide binder layer has the apparent property of being *"n"* type. In any event negative charges attracted to the selenium charge are injected from the binder layer substrate, pass through the binder layer, and are trapped at the binder layer top surface. These immobilized charges on the binder layer become fixed when the binder plate and the selenium plate are separated in the dark. The binder layer, therefore, being an insulating rectifying layer, has the property that application of a small electrostatic field causes charges to be injected from the substrate to become trapped near or at the top surface. The potential thus induced on the insulating rectifier layer can be comparable to normal xerographic potentials since it is known that the series capacitance of the insulating rectifier layer during the photoconductor exposure, while biased in the conductive direction, is effectively infinite. The actual capacitance of the insulating rectifier layer, which becomes effective on dis-assembly, can be made comparable with the capacitance of normal xerographic plates.

Therefore in accordance with the invention, semi-conductive films or insulating rectifying layers have been found for which the conductivity differs substantially depending upon the direction of the impressed electric field. As shown by the above example, plates comprising a film of zinc oxide in a binder coated on aluminum have been found to sustain a negative surface charge and are known to sustain negative surface charge many times longer than they will support a positive surface charge. In other words, this film can be made to serve as a resistor-diode conducting electrons from the base to the surface at a much greater rate than in the opposite direction under an equal but opposite field. Further, such conduction will take place without light exposure but only because of the applied field. The distribution of negative charges induced on the zinc oxide surface is a mirror image of the positive electrostatic image formed on the selenium surface. These negative charges remain on the zinc oxide surface and form a negatively charged electrostatic latent image. When the separation is carried out in air, some air breakdown has been found to occur causing the negatively induced image to be of a reduced magnitude than that formed on the selenium plate. Where separation is carried out in a vacuum or with a controlled potential, this presents no problem. That is, a control potential may be provided between the bases during separation as, for example, disclosed in copending application Serial No. 747,542, filed July 9, 1958, now U.S. Patent No. 3,057,-719, in the names of Walkup and Byrne.

Thus in the zinc oxide binder layer, electric current is carried by electrons and holes make no appreciable contribution to the current. If the latent image on the selenium surface were composed of negative charges, the process described above would not work as well with zinc oxide, since a flow of positive charge through the zinc oxide binder layer would be required. In this latter instance, a p-type semiconducting storage or insulating rectifying layer would be necessary to achieve a similar result.

In general, the induction of a positive electrostatic image from the photoconductor requires a semiconducting storage layer or insulating rectifying layer in which the available current carrier is the electron. Conversely, for the induction of negative electrostatic images from the photoconductor, the available current carrier must be the positive hole. Therefore, with a proper selection of appropriate materials, a latent image having a polarity of choice opposite the photoconductor may be induced and subsequently utilized as is conventional in the xerographic process.

While zinc oxide had been prominently mentioned as the rectifying layer with which the process of the invention may be carried out, other semiconductors which will form highly rectifying contacts to a conducting support, and which need not be inherently photoconductive, would also form suitable storage or insulating rectifying layers. In other words, it is essential that current flow into the semiconductive layer or insulating rectifying layer only when biased in the forward direction by the electrostatic image being formed on the photoconductive surface that is effective to induce the image on the surface of the insulating rectifying layer.

The insulating rectifying layers may contain the desired properties for use in the instant invention or they may be so rendered. Thus where the insulating layer is itself insufficiently rectifying, i.e., conducts both polarities equally or is only slightly p-type or n-type, rectification may be supplied by forming a highly rectifying barrier layer between the insulating layer and the conductive backing which injects charge carriers into the insulator or alternatively, the layer may be doped. As stated above, zinc oxide is strongly n-type so that modification of the material either by doping or by the interposition of a barrier layer between the zinc oxide and the conductive electrode are unnecessary for utility herein. Vitreous selenium is p-type and commercial xerographic plates on an aluminum backing may be used as described herein. However, as a properly prepared selenium layer is only slightly p-type, the use of such unmodified layers results in moderately long charging times. By the addition of a rectifying barrier layer such as cuprous oxide between the vitreous selenium and the conductive backing, the charging time may be reduced to the order of 1 or 2 seconds. Alternatively, the selenium may be doped to either render it highly p-type or even to reverse the polarity of the major charge carriers to render the material n-type. Thus, as disclosed in U.S. 2,863,768, when alloyed with arsenic trisulfide, selenium becomes highly n-type while still being an effective photoconductive insulator. Tellurium is also a suitable additive to selenium to render a vitreous selenium layer n-type. The selenium may also be rendered more highly p-type by the inclusion of very minor amounts of halogen. In the case of doping with a halogen, care must be taken to prevent the inclusion of too much impurity which would render the material too conductive for use as a photoconductive insulator.

As should be apparent, substantially all known photoconductive insulating layers can be employed in connection with this invention, either intrinsically or as modified according to the teaching herein, and included within this group, for example, are semiconductive materials cooled below the temperature necessary for thermal generation of charge carriers therein which thus act as insulators.

Therefore in the instant invention, it is essential that the charge inducing member induce a developable charge density on the insulating rectifying layer. To accomplish this, there must be a sufficient magnitude of potential available from a potential source and the intensity level of the activating radiation must be sufficiently high to render the charge inducing member sufficiently and selectively conductive in an allotted charging time. Most photoconductors employed in xerography, such as vitreous selenium, have a quantum efficiency of somewhat less than unity. This means that, at best, for each photon of light which strikes a xerographic plate, one "electron" or "hole" is removed. By obtaining charge-carrier multiplication whereby each absorbed photon will produce many charge-carriers within the plate, there results quantum efficiency greater than unity. In other words, by carrier multiplication is meant causing flow of more than one electronic charge (in excess of dark current) by the action of each photon of light energy incident on a light sensitive medium. This phenomenon of multiplying plates and their structures are disclosed in copending application, Serial No. 714,929, filed February 12, 1958 in the name of J. Bardeen and now Patent U.S. 3,041,166.

The instant invention when used with multiplying plates of the type described in the above referred to Bardeen patent captures the image while preserving speed. It is known that the time necessary to induce a charge onto the surface of an insulating rectifier layer to a potential within $1/e$ of its final value, is the product of the resistivity of the material, measured in the conductive direction, times the dielectric constant of the material expressed in MKS units. Because of this factor, it is necessary to either maintain contact for an adequate time to effect desired charge density or to provide a greater charge density in the charge inducing member and allow charge to be induced for less time as required for equilibrium, to result in a charge deposit on the insulating rectifying layer equal to what is desired. Now however, in accordance with the instant invention, the induction time may be decreased by utilizing multiplier photoconductors as charge inducing members having a quantum efficiency greater than unity.

The multiplying effect is produced when using photoconductors such as cadmium sulfide and cadmium selenide. Therefore, in the instant invention, the photoconductive layer designated 15 can be constituted of a photoconductive material such as cadmium sulfide to achieve a desired quantum multiplication. With such an arrangement, less light is required to achieve the desired charge density on the surface of plate 23. By this means the rate of induced image formation, especially in automatic machines, can be increased dependent on the multiplication effect available with the photoconductor employed. Thus, the handicap of high dark decay characteristics associated with these multiplying plate structures is immaterial in the instant invention in which it is not necessary that the charge formed on the surface of the inducing member be developable. Rather, in accordance with the invention, retention of charge by the inducing member may totally be unnecessary beyond being utilized to induce an image pattern onto an insulating rectifying layer. Therefore in accordance with the instant invention, utilizing simultaneous application of field and exposure, a photoconductor having a quantum efficiency of greater than unity may be utilized to advantage to induce charge patterns on insulating rectifying layers in place of other photoconductors usually used in commercial xerography.

Since the highest possible image potential or charge on the insulating rectifying layer is the desired goal, the space between surfaces during the induction formation should be as small as possible. Since the induction image should faithfully represent the original image, all capacitance should preferably be uniform throughout the entire area of interest. In the case of an air film, this means that the presence of dust particles could constitute a critical factor, and should therefore consciously be excluded. Also preferably, although not necessarily, the insulating rectifying layer, the photoconductor layer or both should be sufficiently flexible to conform to the irregularities of the other surface as to minimize the extent of interference caused by occasional dust particles or the like.

Pressure exerted on the backs of the respective plates has found to reduce the air film thickness to accord induced potentials of higher order. Also the use of insulating liquids of high specific conductive capacitance in place of the air film has also been found to increase the gap capacitance.

The advantages of the invention should be instantly apparent in that it accords expeditious induction of electrostatic latent images on insulating rectifying layers simultaneous with exposure while according increased sensitivity of response to radiation by the use of multiplying plates as the charge inducing member. At the same time by means of the invention, "wear and tear" on the delicate surface of the inducing photoconductive insulator is largely eliminated. That is, since the necessity for developing the image on the inducing photoconductor, transferring the developed image and cleaning off the residual powder is eliminated, physical damage to a fragile surface such as vitreous selenium is at an absolute minimum.

In the above description, there is disclosed a novel method and apparatus for induction charging of an insulating rectifying layer. From the discussion of the invention in connection with the drawings, there will be suggested obvious modifications and variations to those skilled in the art and such variations and modifications are intended to be included in the scope of this invention and, it is intended to cover the invention broadly within the claims. For example, in FIG. 2, a flat plate could be substituted for drum 35. Also, for a full frame exposure, a flat plate could be stopped momentarily during exposure instead of a continuous slit exposure as illustrated.

What is claimed is:

1. A method of forming an electrostatic latent image of original copy by induction on a first plate comprising an insulating rectifying layer supported on a conductive substrate and capable of allowing flow of current in a first direction and substantially insulating in the reverse direction including:

(a) placing a second plate comprising a photoconductive insulator overlying a conductive radiation transmitting substrate with the surface of the insulator in closely spaced substantially contiguous relationship to the surface of a first plate on which an image is to be formed;

(b) connecting a charging potential between the substrates of said plates; and, (c) while said potential is connected exposing said second plate to an activating radiation image of original copy for a time period sufficient to induce a charge pattern of the copy on the surface of the first plate.

2. The method according to claim 1 in which said second plate comprises a material having a quantum efficiency greater than unity.

3. A method of forming an electrostatic latent image of original copy by induction on a first plate comprising an insulating rectifying layer supported on a conductive substrate and capable of allowing flow of current in a first direction and substantially insulating in the reverse direction including:

(a) placing a second plate comprising a photoconductive insulator overlying a conductive transparent substrate with the surface of the insulator in closely spaced substantially contiguous relationship to the insulating rectifying layer surface of a first plate on which an image is to be formed;

(b) connecting a charge potential between the substrates of said plates;

(c) while said potential is connected exposing said second plate through the transparent substrate to an activating radiation image of original copy for a time period sufficient to induce a charge pattern of the copy on the surface of the insulating rectifying layer; and, (d) separating said plates in a manner to produce an induced charge pattern of original copy on the surface of said first plate developable with electroscopic powder deposition.

4. The method according to claim 3 in which said second plate comprises a material having a quantum efficiency greater than unity.

5. A method of forming an electrostatic latent image of original copy by induction on a first plate comprising an insulating rectifying layer supported on a conductive substrate and capable of allowing flow of current in a first direction and substantially insulating in the reverse direction more predominantly with one polarity of current than the other including:

(a) placing a second plate comprising a photoconductive insulator overlying a conductive transparent substrate with the surface of the insulator in closely spaced substantially contiguous induction charging relation to the surface of an insulating rectifying layer of a first plate on which an image is to be formed;

(b) connecting opposite poles of a D.C. charging potential between the substrates of said plate with the pole connected to the substrate of the first plate being of the same polarity as the corresponding predominance of its conductivity;

(c) while said potential is connected exposing an activating radiation image of original copy through the transparent substrate of the second plate for a time period sufficient to induce a charge pattern of the copy on the surface of the insulating rectifying layer of the first plate; and, (d) separating said plates whereby said induced charge pattern of original copy is retained on said insulating rectifying layer and is developable with electroscopic powder deposition.

6. A method of forming an electrostatic latent image of original copy by induction on a first plate comprising an insulating rectifying layer capable of allowing flow of current in a first direction and substantially insulating in the reverse direction and supported on a conductive substrate including:

(a) placing a second plate comprising a photoconductive insulator overlying a conductive transparent substrate with the surface of the insulator in closely spaced substantially contiguous relationship to the insulating rectifying layer surface of a first plate on which an image is to be formed;

(b) connecting a D.C. charging potential between the substrates of said plates;

(c) concomitant with connection of said potential, exposing the substrate of said second plate to an activating radiation image of original copy for a time period sufficient to induce a charge pattern of the copy on the surface of the insulating rectifying layer of said first plate; and, (d) placing said induced image bearing surface into closely spaced relationship with the surface of an insulating rectifying layer of a third plate whereby a charge pattern of original copy is induced on the surface of the insulating rectifying layer of said third plate.

7. The method according to claim 6 in which the insulating rectifying layers of said first and third plates are predominantly conductive in the direction of current flow to current of opposite polarities.

8. In the method of xerography in which developable electrostatic latent images are formed on a support surface, the improvement comprising a method of forming an electrostatic latent image of original copy by induction on the surface of a first plate comprising an insulating rectifying layer supported on a conductive substrate and capable of allowing flow of current in a first direction and substantially insulating in the reverse direction including:

(a) placing a second plate comprising a photoconductive insulator overlying a conductive transparent substrate with the surface of the insulator in closely spaced substantially contiguous relationship to the surface of an insulating rectifying layer on a first plate on which an image is to be formed;

(b) connecting a charging potential between the substrates of said plates;

(c) while said potential is connected simultaneously exposing said second plate through the transparent substrate to an activating radiation image of original copy for a time period sufficient to induce a charge pattern of the copy on the surface of the insulating rectifying layer; and, (d) separating said plates whereby the insulating rectifying layer retains an induced charge pattern of original copy developable with electroscopic powder deposition.

References Cited by the Examiner

UNITED STATES PATENTS 2,817,277 12/1957 Bogdonoff ____________ 95—1.7
2,833,648 5/1958 Walkup ____________ 95—1.7 X
2,853,383 9/1958 Keck ____________ 95—1.7 X
2,937,943 5/1960 Walkup ____________ 95—1.7 X
2,962,374 11/1960 Dessauer ____________ 95—1.7 X NORMAN G. TORCHIN, *Primary Examiner.*

EVON C. BLUNK, *Examiner.*

D. D. PRICE, *Assistant Examiner.*